US 7,506,322 B2

(12) United States Patent
Edara et al.

(10) Patent No.: US 7,506,322 B2
(45) Date of Patent: Mar. 17, 2009

(54) SYSTEM AND METHOD OF UTILIZING A HARDWARE COMPONENT TO EXECUTE AN INTERPRETIVE LANGUAGE

(75) Inventors: Vidyasagar Edara, San Jose, CA (US); Paul Zimmerman, Fremont, CA (US); Yair Raz, Sunnyvale, CA (US); Anuradha Bommaji, San Jose, CA (US)

(73) Assignee: Synopsys, Inc., Mountain View, CA (US)

( * ) Notice: Subject to any disclaimer, the term of this patent is extended or adjusted under 35 U.S.C. 154(b) by 1238 days.

(21) Appl. No.: 10/020,420

(22) Filed: Dec. 13, 2001
(Under 37 CFR 1.47)

(65) Prior Publication Data
US 2004/0068717 A1 Apr. 8, 2004

(51) Int. Cl.
*G06F 9/45* (2006.01)
*G06F 9/30* (2006.01)
*G06F 9/44* (2006.01)

(52) U.S. Cl. .................. 717/139; 712/208; 712/211; 712/245

(58) Field of Classification Search ........... 717/139; 712/208–213, 245–248
See application file for complete search history.

(56) References Cited

U.S. PATENT DOCUMENTS

| | | | | |
|---|---|---|---|---|
| 4,323,963 A | * | 4/1982 | Wu | 712/234 |
| 4,964,040 A | * | 10/1990 | Wilcox | 710/3 |
| 5,179,734 A | * | 1/1993 | Candy et al. | 712/1 |
| 5,442,779 A | * | 8/1995 | Barber et al. | 707/4 |
| 5,564,050 A | * | 10/1996 | Barber et al. | 707/4 |
| 5,740,441 A | * | 4/1998 | Yellin et al. | 717/134 |
| 5,999,731 A | * | 12/1999 | Yellin et al. | 717/126 |
| 6,021,273 A | * | 2/2000 | Griesemer | 717/148 |
| 6,141,793 A | * | 10/2000 | Bryant et al. | 717/115 |
| 6,192,516 B1 | * | 2/2001 | Griesemer | 717/139 |
| 6,254,288 B1 | * | 7/2001 | Heyns et al. | 717/139 |
| 6,317,872 B1 | * | 11/2001 | Gee et al. | 717/152 |
| 6,658,655 B1 | * | 12/2003 | Hoogerbrugge et al. | 717/139 |
| 6,910,206 B1 | * | 6/2005 | Nevill | 717/153 |
| 2003/0028757 A1 | * | 2/2003 | May et al. | 712/226 |

OTHER PUBLICATIONS

Adix et al., "Interpretive Execution of Real-Time Control Applications," Apr. 1976, ACM, p. 78-87.*

* cited by examiner

*Primary Examiner*—Wei Y Zhen
*Assistant Examiner*—Qing Chen
(74) *Attorney, Agent, or Firm*—Bever, Hoffman & Harms, LLP; Jeanette S. Harms

(57) ABSTRACT

A system and method of executing an interpretive language in a system having a processing component with native software processes and a memory component. A hardware component is coupled with the processing component and the memory component. The hardware component assists with the processing of the interpretive language and the system is permitted to execute the native software processes of the processing component.

13 Claims, 2 Drawing Sheets

SYSTEM AND METHOD OF UTILIZING A HARDWARE COMPONENT TO EXECUTE AN INTERPRETIVE LANGUAGE

TECHNICAL FIELD

This invention relates to systems and methods which process interpretive programming languages.

BACKGROUND OF THE INVENTION

In conventional embedded systems having a processor and an associated memory component, two approaches have been made for the processing of a software interpretive language running on the system. A first approach is a software based approach, in which a software interpreter such as a virtual machine is employed to interpret and assist in processing of an interpretive language. In this software based approach, numerous cycles are required to interpret instructions, fetch instructions from memory and fetch operands from memory. Additionally, in software based interpreters, numerous cycles are required to perform thread switching to enable the processor to switch to a different program running on the system. Disadvantageously, in this software based approach a significant amount of interpreter overhead is required and the necessity of requiring numerous cycles to provide read data to the processor results in slow processing of the interpretive language.

Conventional systems have also employed a hardware based approach, using a processor that executes the interpretive language as its native instruction set. The conventional hardware based approach is very limited in that systems which utilize these processors are capable of executing only the interpretive language. With the conventional hardware based approach, other software applications, such as those that are in a different language than the interpretive language, cannot be run by the processor. Such software applications would have to be changed or replaced in order to be run by the processor. This is highly impractical and inefficient, especially with embedded systems having an existing processor and memory component.

DETAILED DESCRIPTION

Figure 1:
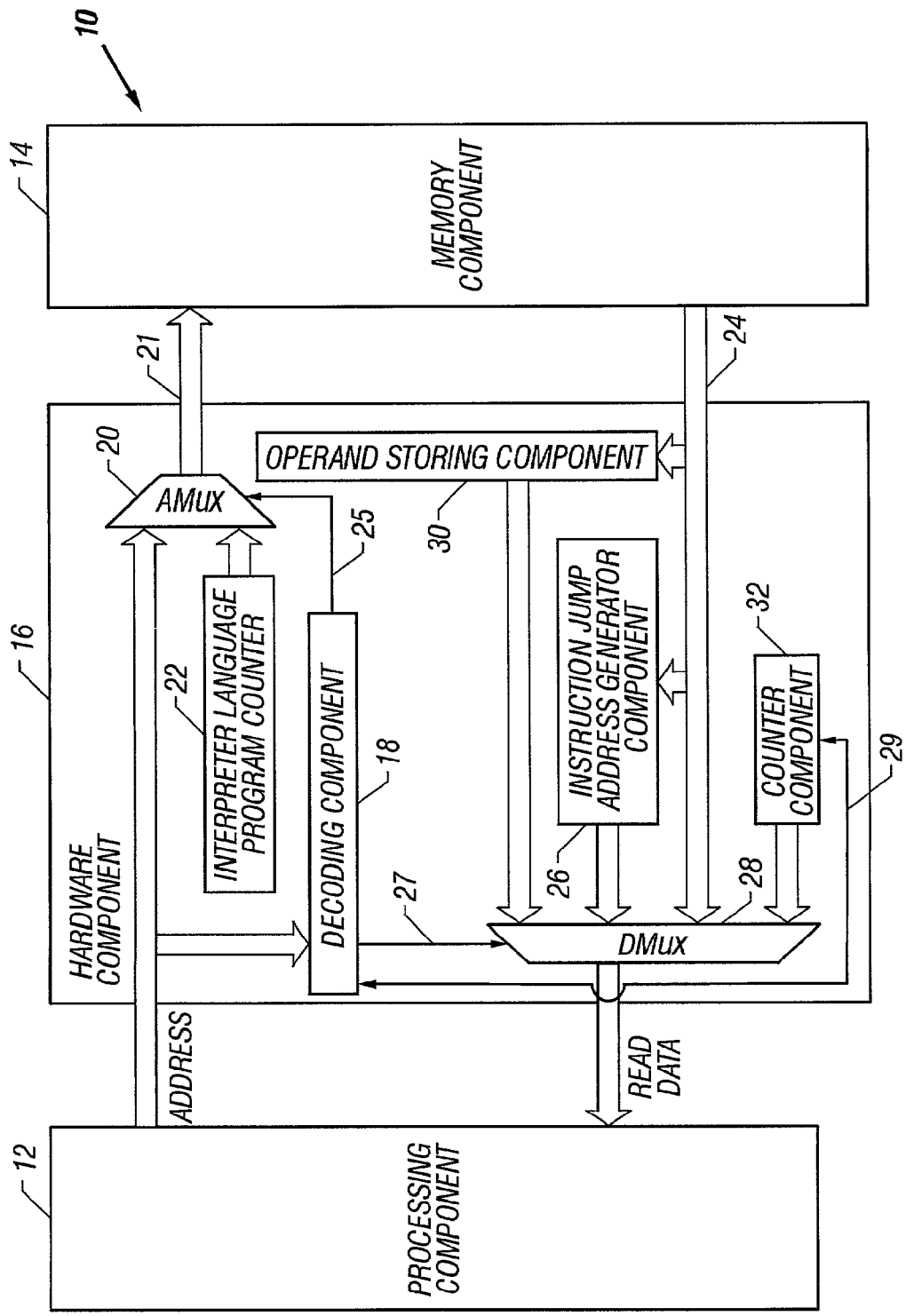
FIG. 1 is a block diagram of a system with a processing component, memory component and hardware component.

Referring to FIG. 1, system 10 that executes an interpretive language having a processing component 12 with native software processes and a memory component 14 is shown. Hardware component 16 is coupled with the processing component 12 and the memory component 14 with the hardware component being employed to assist in processing of one or more interpretive languages. The hardware component 16 is capable of assisting the processing of an interpretive language and the system 10 is permitted to execute the native software processes of the processing component 12. The hardware component 16 manipulates an address received from the processing component and the read data from the memory component to the processing component to decrease software interpreter overhead of fetching and decoding interpretive instructions, switching threads, and obtaining operands to increase performance of the system.

In one aspect, the hardware component 16 generates an instruction jump address to assist the processing of the interpretive language. The current address for the interpretive language instruction stream is maintained at the hardware component 16. An address sent from the processing component 12 and received at the hardware component 16 is compared to a fixed instruction fetch address stored at the hardware component. If the address received from the processing component 12 corresponds to the fixed instruction fetch address stored at the hardware component 16, then the current interpretive language address at the hardware component is automatically incremented at the hardware component. In response to the hardware component 16 determining that an address received from the processing component corresponds to the fixed instruction fetch address stored at the hardware component, an instruction jump address is generated and the instruction jump address is then transmitted from the hardware component 16 to the processing component 12. In order to generate an instruction jump address, the current interpretive language address is initially transmitted from the hardware component 16 to the memory component 14 upon determining that the address received from the processing component 12 corresponds to the fixed instruction fetch address stored at the hardware component.

In generating an instruction jump address at the hardware component 16, data associated with the current interpretive language address is fetched from the memory component 14. The data from the memory component 14 is transmitted to the hardware component 16 with the data containing at least a current interpretive instruction. The current interpretive instruction is received at the hardware component 16 and the hardware component shifts the current interpretive instruction by a predetermined number of bits to establish a shifted address. The shifted address is added at the hardware component 16 to a base address stored at the hardware component to calculate an instruction jump address.

In particular, referring still to FIG. 1, an address received at the hardware component 16 from the processing component 12 is compared to the fixed instruction fetch address stored at decoding component 18 of the hardware component. The decoding component 18 decodes addresses from the processing component 12 and generates multiplexer select signals. The decoding component 18 determines if the address received from the processing component 12 does not correspond to the fixed instruction fetch address. If the address from the processing component 12 does not correspond to the fixed instruction fetch address then this address is sent directly to the memory component 14. Upon the decoding component 18 determining that the address received from the processing component 12 does not correspond to the fixed instruction fetch address stored therein, the decoding component sends a select signal to address multiplexer 20 to pass the address from the processing component via the address multiplexer 20 along bus 21 to the memory component.

In generating an instruction jump address at the hardware component 16, the current address for the interpreted language instruction stream is maintained at an interpreter language program counter 22 of the hardware component. The interpretive language program counter 22 is a register which holds the current interpretive language address and operates as a program counter for the interpretive language. The decoding component 18 determines if the address received from the processing component 12 corresponds to the fixed instruction fetch address stored at the decoding component. Initially, the interpreter language program counter 22 is loaded with a starting address of an interpretive language instruction stream. The interpreter language program counter 22 is automatically incremented to the next address of the interpretive language instruction stream upon the processing component 12 sending an address which equals the fixed instruction fetch address. For instance, if the processing component 12 reads an address for "fetch next instruction" the interpreter language program counter 22 is automatically incremented to the next interpretive language address and the current interpretive language address is transmitted to the memory component 14.

If the decoding component 18 determines that the address received corresponds to the fixed instruction fetch address stored therein, then the current interpretive language address contained in the interpreter language program counter 22 is sent to the memory component 14. A select signal is transmitted along line 25 from the decoding component 18 to the address multiplexer component 20 of the hardware component 16 in response to the decoding component 18 determining that the address from the processing component 12 does correspond to the fixed instruction fetch address stored at the decoding component. The current interpretive language address is transmitted from the interpreter language program counter 22 of the hardware component 16 to the memory component 14 via the address multiplexer component 20 based on the select signal received at the address multiplexer component from the decoding component. Data is then fetched from a location at the memory component 14 which is associated with the current interpretive language address received from the interpreter language program counter 22. The data fetched from the memory component 14 contains a current interpretive instruction and the data from the memory component 14 is transmitted along data bus 24 back to an instruction jump address generator 26 of the hardware component. The current interpretive instruction is shifted by a predetermined number of bits at the instruction jump address generator 26 to establish a shifted address. The shifted address is added to a base address stored in the instruction jump address generator 26 to calculate an instruction jump address.

The instruction jump address is transmitted from the instruction jump address generator 26 to a data multiplexer component 28 of the hardware component. A data multiplexer signal is transmitted along line 27 from the decoding component 18 to the data multiplexer component 28 of the hardware component 16 based on the address received at the decoding component 18 from the processing component 12 corresponding to the fixed instruction fetch address. The instruction jump address is then transmitted from the data multiplexer component 28 to the processing component 12 based on the data multiplexer select signal that is received from the decoding component 18.

In one example, predefined addresses at the decoding component 18 may selectively be addresses for: A) fetch next interpretive instruction; B) fetch 8-bit operand; C) fetch 16-bit operand; D) fetch 24-bit operand. Once an address from processing component 12 (such as address A) is received at the hardware component 16, the decoding component 18 will decode the address, otherwise the address will be sent to the memory component 14. In this example, the decoding component 18 decodes an address received to see if it matches one of the addresses A, B, C, D identified above. If the address coming from the processing component 12 happens to match, for instance the fixed address for A, in this example, then the decoding component 18 will signal the address multiplexer component 20 to pass through and in effect change the address going to the memory component 14 to the current address stored in the interpretive language program counter 22.

If for example, address "A" is received at the decoding component 18 it will decode this as "fetch next interpretive instruction." In this example, instead of outputting the address coming from the processing component, the decoding component will send a switch signal along line 25 to the address multiplexer component 20 to select/output the address from the interpreter language program counter 22. The data coming back to the hardware component 16 from the memory component 14 will have the next interpretive instruction. The next interpretive instruction is then transmitted to the instruction jump address generator component 26. The processing component will need addresses of specific machine code instructions. The instruction jump address generator component 26 generates a jump address for machine code instructions (or operands) associated with the particular interpretive instruction received from the memory component 14.

Another feature which the system 10 performs is the hardware component 16 fetching, from the memory component 14, operands of an interpretive language instruction stream. In order to fetch operands from memory component 14, operand addresses are maintained at the interpreter language program counter 22 of the hardware component 16. Data having at least one operand is fetched from the memory component 14 and the data is then stored at the hardware component 16. The data fetched from the memory component 14 is sent via data bus 24 which is capable of carrying more than one operand to the hardware component 16. The data may comprise an 8-bit operand, a 16-bit operand or a 24-bit operand. In fetching operands from memory component 14, the hardware component 16 determines an operand size requested to be read by the processing component 12 and the operand of the size requested by the processing component 12 is transmitted from the hardware component 16 to the processing component.

Initially, the hardware component 16 determines if an address received from the processing component 12 corresponds to a fixed operand fetch address stored at the hardware component. In particular, the decoding component 18 at the hardware component 16 compares an address received from the processing component 12 to a number of fixed operand fetch address stored at the decoding component 18. The decoding component 18 determines if the address received corresponds to a fixed operand fetch address. If the address corresponds to a fixed operand fetch address, then an operand address is transmitted from interpreter language program counter 22 of hardware component 16 to the memory component 14. Upon the decoding component 18 determining that the address from the processing component 12 corresponds to a fixed operand fetch address stored therein, decoding component 18 transmits a select signal along line 25 to address multiplexer component 20 of the hardware component to enable the address multiplexer component 20 to pass the operand address from the interpreter language program counter 22 to the memory component 14.

Data associated with the operand address is then fetched from the memory component 14. The data fetched from the memory component 14 is transmitted via data bus 24 to an operand storing component 30 of the hardware component 16. The data fetched from memory component 14 comprises at least one operand of an interpretive language instruction stream. In one example, the data bus 24 is a 32-bit data bus such that four bytes of 8-bit data are sent from the memory component 14 to the operand storing component 30 of the hardware component 16. At the hardware component 16, the decoding component 18 determines an operand size requested to be read by the processing component 12. For example, an address from the processing component 12 may signal a request to read "an 8-bit operand," "a 16-bit operand" or "a 24-bit operand."

The operand of the size requested by the processing component 12 is transmitted from the operand storing component 30 to the processing component. The operand storing component may selectively be a register (such as a 32-bit register) which contains the current fetched interpretive language instruction stream to provide operands to the processing component. In doing so, a data multiplexer select signal is transmitted by decoding component 18 along line 27 to data multiplexer component 28 of the hardware component 16 in response to the decoding component 18 determining that the address received from the processing component 12 corresponds to a fixed operand fetch address stored at the decoding component. The operand of the size that was requested by the processing component is then transmitted via the data multiplexer component 28 based on the data multiplexer select signal received from the decoding component 18. The operand storing component 30 is capable of storing multiple operand bytes. The data multiplexer component 28 orients the operand bytes into the order required by the processing component 12 based on the data multiplexer signal received from the decoding component 18 by selecting which bits will be presented to the processing component in which order.

In accelerating the fetching of operands, the data bus 24 from memory component 14 may selectively be 32 bits wide. In some situations, an interpretive instruction may be only one byte having 8 bits. Thus, when an interpretive instruction is fetched, the next three bytes (having 8 bits each) are also obtained. When the interpretive instruction is fetched the hardware component reads the interpretive instruction, but also reads the following three bytes in the interpretive language instruction stream thereby utilizing the entire 32-bit data bus. The 32 bits of data are loaded and stored in the operand storing component 30. Thus, for example upon a jump address being transmitted to the processing component 12, the next instruction may be to "fetch 24-bit operand" (with the operand being 3 bytes having 8 bits each). In this example, because the 3 bytes of the "24-bit operand" are stored in the operand storing component 30 the entire operand is able to be transmitted to the processing component 12 in one cycle.

When the processing component 12 receives a jump address, the processing component jumps to machine code stored therein which will require certain operands (for example, the next 24-bit operand). Thus, the machine code of the processing component issues a read to fetch the "24-bit operand" in this example. Instead of multiple cycles to fetch the individual bytes of the operand, the entire operand stored in the operand storing component 30 can be transmitted to the processing component 12 in one cycle. This also avoids memory cycles (seen in software based systems) which can be slower than hardware access. As seen herein, one of the functions of the decoder component 18 is to decode how many operand bytes the processing component 12 needs to read (for example, decoding of fixed operand fetch addresses to fetch: 8-bit operand, 16-bit operand or 24-bit operand). Based on how many 8-bit operand bytes the processing component 12 needs to read, the hardware component 16 selects that portion of what is stored in the operand storing component 30 to send to the processing component. The operand storing component 30 will send only the number of bytes requested by the processing unit 12. For instance, the operand storing component 30 may hold one eight bit interpretive instruction and three eight-bit operands, but if the processing component 12 only requires/requests one 16-bit operand, only two of the three eight-bit operand bytes will be sent to the processing component.

Figure 2:
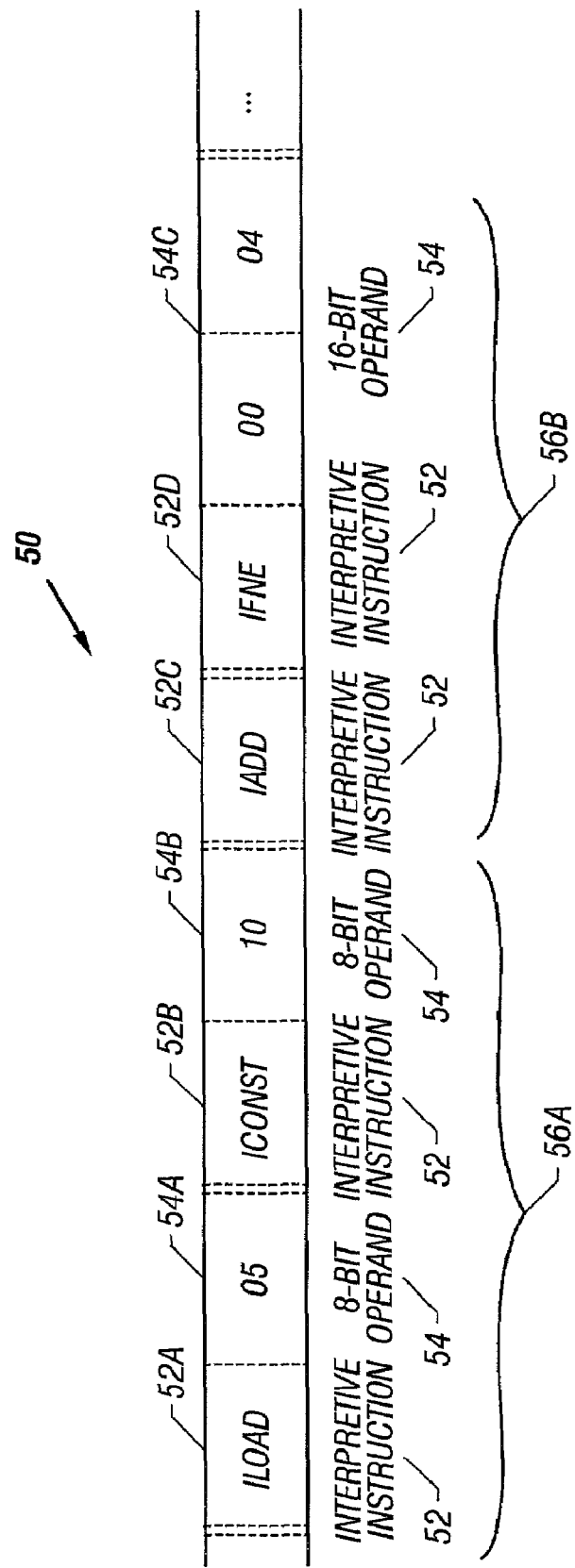
FIG. 2 is an illustrative diagram of an exemplary interpretive language instruction stream having interpretive instructions and operands.

Referring to FIG. 2, an example of an interpretive language instruction stream 50 is shown with interpretive instructions 52 and operands 54. In this example, one 32-bit amount of data 56A of the interpretive language instruction stream 50 has interpretive instruction ILOAD 52A followed by 8-bit operand 54A and interpretive instruction ICONST 52B followed by 8-bit operand 54B. In this example, the interpretive instructions 52 are 8-bits wide. The next 32-bit amount of data 56B, in this example, has two interpretive instructions IADD and IFNE, 52C, 52D, followed by a 16-bit operand 54C. The interpretive language instruction stream 50 of FIG. 2 is for exemplary purposes and although the example interpretive instructions (ILOAD, ICONST, IADD, IFNE) may be utilized in a JAVA interpretive language, any interpretive language (and associated interpretive instructions) may selectively be employed.

Referring back to FIG. 1, the hardware component 16 also aids in the performance of thread switch jumping for efficient processing within the system 10. The hardware component 16 stores a thread switch jump address and transmits the thread switch jump address from the hardware component to the processing component 12. The decoding component 18 of the hardware component 16 determines if an address received from the processing component 12 is equal to the fixed instruction fetch address stored at the decoding component 18. If the address received from the processing component 12 corresponds to the fixed instruction fetch address, then a counter component 32 of the hardware component 16 is incremented. Each time the decoding component 18 determines an address received corresponds to the fixed instruction fetch address, the decoding component sends a signal along line 29 to the counting component 32 so that the counting component can be incremented. The counting component 32 of hardware component 16 counts a total number of addresses received from the processing component 12 which are determined to be equal to the fixed instruction fetch address stored at the decoding component. The counting component 32 counts the total number and determines that the total number has reached a predetermined number. Upon reaching the predetermined number of received addresses which equal the instruction fetch address, the thread switch jump address at the counting component 32 is transmitted from the counting component 32 to the data multiplexer component 28 of the hardware component 16.

The counter component 32 sends a signal along line 29 to the decoding component 18 to indicate that the predetermined number of addresses matching the fixed instruction fetch address has been reached. A data multiplexer select signal is transmitted from the decoding component 18 along line 27 to the data multiplexer component 28 in response to the total number counted at the counter component 32 reaching the predetermined number. The thread switch jump address is accordingly transmitted from the counter component 32 to the processing component 12 via the data multiplexer component based on the data multiplexer select signal. A thread switch jump address which pertains to a thread switch routine of the processing component is thus provided by the hardware component 16.

An interpretive language is able to be run quickly and efficiently on an existing system having a processing component and memory component with minimum additional hardware. The hardware component interface interacting with the processing component and memory component allows increased speed of processing of interpretive languages without altering the existing features of the processing component and allows the processing component to execute its native software processes.

While a detailed description of exemplary embodiments of the invention have been given, it should be appreciated that many variations can be made thereto without departing from the scope of the invention as set forth in the appended claims.

What is claimed is:

1. A method of facilitating executing an interpretive language in a system including a processing component, a memory component, and a hardware component, wherein the hardware component provides an interface between the processing component and the memory component, the method of the hardware component comprising:
   receiving an address from the processing component;
   determining whether the received address matches a fixed instruction fetch address;
   determining whether the received address matches one of a plurality of fixed operand fetch addresses;
   incrementing an interpreter language program counter and sending a current interpretive language address to the memory component when the received address matches the fixed instruction fetch address;
   sending an operand address to the memory component when the received address matches one of the plurality of fixed operand fetch addresses;
   sending the received address to the memory component when the received address fails to match the fixed instruction fetch address and any of the plurality of fixed operand fetch addresses; and
   receiving data from the memory component based on one of the fixed instruction fetch address, the operand address, and the received address.

2. The method of claim 1, further including:
   calculating an instruction jump address using the data and sending the instruction jump address to the processing component when the data is based on the fixed instruction fetch address.

3. The method of claim 1, further including:
   storing the data and sending the data to the processing component using a predetermined bit order when the data is based on the operand address.

4. The method of claim 1, further including:
   sending the data to the processing component when the data is based on the received address.

5. The method of claim 1, further including:
   counting a number of times the received address matches the fixed instruction fetch address; and
   when the number reaches a predetermined threshold, sending a thread switch jump address to the processing component.

6. A hardware component that facilitates executing an interpretive language in a system, the system including processing component and a memory component, wherein the hardware component provides an interface between the processing component and the memory component, the hardware component comprising:
   a first multiplexer for receiving an address from the processing component and providing an output to the memory component;
   an interpreter language program counter for providing inputs of the first multiplexer;
   a decoding component for:
      receiving the address,
      comparing the received address to stored addresses, the stored addresses including a fixed instruction fetch address and a plurality of fixed operand fetch addresses, and
      controlling the output of the first multiplexer based on a result of the comparing;
   a second multiplexer for receiving data from the memory component and providing an output to the processing component;
   an instruction jump address generator component for receiving the data and providing inputs to the second multiplexer;
   an operand storing component for receiving the data, storing any operands of the data, and providing inputs to the second multiplexer,
   wherein the decoding component controls the second multiplexer based on the result of the comparing; and
   a counter component for receiving an input from the decoding component and providing outputs to the second multiplexer and the decoding component.

7. The hardware component of claim 6, wherein the decoding component sets the first multiplexer to provide the received address as the output of the first multiplexer when the received address fails to match any stored address.

8. The hardware component of claim 6, wherein the decoding component sets the first multiplexer to provide a current interpretive language address stored in the interpreter language program counter as the output of the first multiplexer when the received address matches the fixed instruction fetch address.

9. The hardware component of claim 6, wherein the decoding component sets the first multiplexer to provide an operand address stored in the interpreter language program counter as the output of the first multiplexer when the received address matches one of the plurality of fixed operand fetch addresses.

10. The hardware component of claim 6, wherein the decoding component sets the second multiplexer to provide the data as the output of the second multiplexer when the received address fails to match any stored address.

11. The hardware component of claim 6, wherein the decoding component sets the second multiplexer to provide an output of the instruction jump address generator component as the output of the second multiplexer when the received address matches the fixed instruction fetch address.

12. The hardware component of claim 6, wherein the decoding component sets the second multiplexer to provide an output of the operand storing component as the output of the second multiplexer when the received address matches one of the plurality of fixed operand fetch addresses.

13. The hardware component of claim 6, wherein the counter component counts a number of times the received address matches the fixed instruction fetch address, as determined by the decoding component, and
   wherein when the number reaches a predetermined threshold, the counter component provides a thread switch jump address to the second multiplexer and the decoding component sets the second multiplexer to provide the thread switch jump address as the output of the second multiplexer.

* * * * *

UNITED STATES PATENT AND TRADEMARK OFFICE
CERTIFICATE OF CORRECTION

PATENT NO. : 7,506,322 B2 Page 1 of 1
APPLICATION NO. : 10/020420
DATED : March 17, 2009
INVENTOR(S) : Vidyasagar Edara et al.

It is certified that error appears in the above-identified patent and that said Letters Patent is hereby corrected as shown below:

Column 7, line 54, insert -- a -- before "pro-".

Signed and Sealed this

Twenty-second Day of September, 2009

David J. Kappos
*Director of the United States Patent and Trademark Office*